May 28, 1935.  W. F. KELPE  2,003,000
SEAL FOR DYNAMO ELECTRIC MACHINES
Filed Dec. 10, 1930
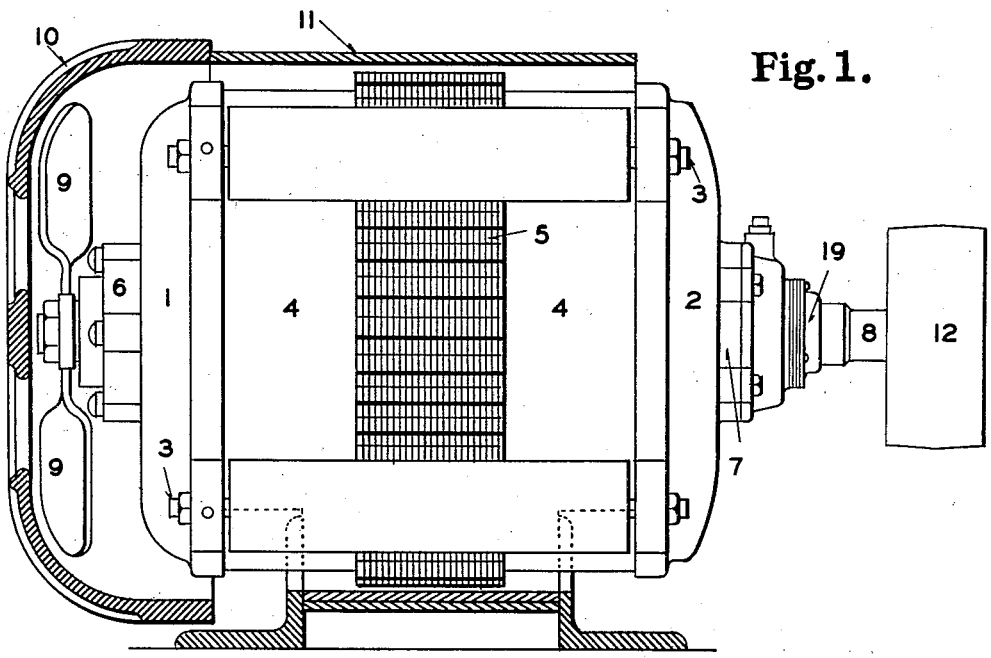
Fig. 1.
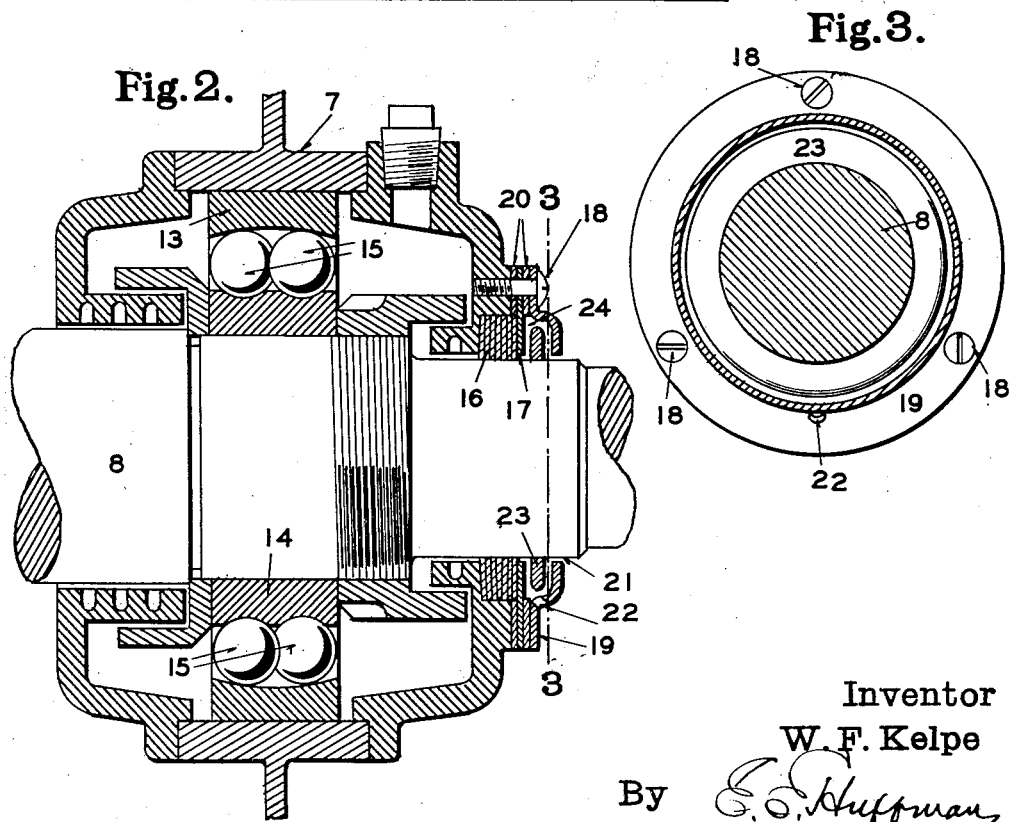
Fig. 2.
Fig. 3.
Inventor
W. F. Kelpe
By E. S. Huffman,
Att'y.

Patented May 28, 1935

2,003,000

UNITED STATES PATENT OFFICE 2,003,000

SEAL FOR DYNAMO ELECTRIC MACHINES

Walter Frederick Kelpe, St. Louis County, Mo., assignor to Wagner Electric Corporation, St. Louis, Mo., a corporation of Delaware Application December 10, 1930, Serial No. 501,192

4 Claims. (Cl. 286—5)

My invention relates to motors of the "totally enclosed" type which are cooled by air currents generated by a fan on the motor shaft adjacent one end of the motor body, said currents being directed over the external surface of the motor. I have found that in such motors the reduction in air pressure at the center of the fan draws air out of the interior of the motor through the adjacent shaft bearing, and (since the motor casing is otherwise substantially air-tight) this results in air being drawn in through the packing and bearing adjacent the opposite or driving end of the shaft. Owing to this, when water falls or collects on the driving end of the shaft some of its is drawn into the motor with the incoming air to the detriment of both the mechanical and electrical parts of the machine. Ordinary shaft packings have proved inadequate to prevent such entrance of water and it is the object of my invention to provide means whereby water received by the exposed end of the shaft will be prevented from reaching a point on the shaft from which it can flow or be drawn into the motor.

In the accompanying drawing, which illustrates one form of motor made in accordance with my invention, Figure 1 is a side elevation, the shell or casing being shown in section; Figure 2 is an enlarged longitudinal section through the bearing at the driving end of the motor shaft; and Figure 3 is a section taken on the line 3—3 of Figure 2.

Referring first to Figure 1, the casing of the motor comprises end pieces 1 and 2 between which are clamped, by means of tie rods 3, a pair of rings 4 and the laminated core 5 of the stator winding. Carried by the end piece 1 is a bearing 6 and by the end piece 2 a bearing 7 in which bearings is journaled the motor shaft 8 carrying the rotor (not shown). Mounted on the end of the shaft adjacent the bearing 6 is a fan 9. A fan cap 10 and a sheet metal cylinder 11 together form a shell for directing the air currents from the fan over the motor body. Mounted on the projecting end of the shaft beyond the bearing 7 is a pulley 12 or other means for transmitting power from the motor.

The bearing 7 at the power transmitting end of the motor is shown in detail in Figure 2. It is preferably of anti-friction type, the stationary part being provided with a race 13 and the rotary part with a race 14 between which races are positioned balls 15. Formed in the outer end of the stationary part of the bearing is an annular recess to receive a packing 16 of felt or similar material held in place by an annulus 17 secured to the bearing by screws 18. A second annulus 19 forming a water guard is also secured in position by the screws 18 and is somewhat dished, as shown in Figure 2, to provide a space 24 between it and the annulus 17. Gaskets 20 of cork, rubber, or the like are preferably placed between the annulus 17 and the ends of the bearings and between the two annuli. The opening for the shaft in the annulus 19 must, of course, be somewhat larger than the diameter of the shaft so that the edge of the annulus will not touch the shaft and thus interfere with the action of the ball bearing in supporting the entire weight of the rotor. The space 21 between these parts should be very slight, (being shown somewhat exaggerated in Figure 2) in order to form capillary retaining means for water on the exposed portion of the shaft. Formed in the annulus 19 is an opening 22 to admit air to the space between the two annuli whence it passes through the bearing into the casing to replace the air drawn out of the casing by the suction of the fan. Therefore there is no passage of air through the space 21 and the centrifugal force of the rotating water will cause it to be thrown outwardly along both the inner and outer faces of the annulus 19. That travelling along the inner face will be discharged through the opening 22 which, being situated at the lowest point of the space 24, acts not only as an air inlet but also as a water drain.

While I find that the construction above described effectively prevents the entrance of water when the motor is running at high speed, for example 1800 R. P. M. or more, to insure discharge of the water at lower speeds, I provide the shaft with a disc 23 located in the space 24 to intercept and throw off any water which may advance that far along the shaft. For convenience of manufacture the disk is formed of a separate ring of sheet metal having a press fit with the shaft.

Having fully described my invention, what I claim as new and desire to secure by Letters Patent of the United States is:

1. In a device of the class described, the combination of a machine casing, a rotor shaft mounted in a bearing in a wall of said casing and projecting exteriorly beyond said casing, the interior of said casing being subject to a sub-atmospheric pressure which causes air to be drawn in through said bearing, and means for preventing liquid which may collect on the exterior portion of said shaft from being drawn into the casing with the air to the detriment of elements in the casing, said means comprising a liquid guard secured to the exterior of the casing and spaced from said bearing and surrounding said shaft and forming therewith a gap of a size to sustain a capillary column, said guard being provided with means other than the gap for permitting the passage of air from the exterior of the guard to the interior of the casing through the bearing to thereby prevent the establishment of a pressure differential between the exterior and the interior of the guard which would cause air to be drawn through the gap.

2. In a device of the class described, the combination of a machine casing, a rotor shaft mounted in a bearing in a wall of said casing and projecting exteriorly beyond said casing, the interior of said casing being subject to a sub-atmospheric pressure which causes air to be drawn in through said bearing, means for preventing liquid which may collect on the exterior portion of said shaft from being drawn into the casing with the air to the detriment of elements in the casing, said means comprising a liquid guard secured to the exterior of the casing and spaced from said bearing and surrounding said shaft and forming therewith a gap of a size to sustain a capillary column, and a radially projecting liquid discharge element on said shaft and rotating therewith and positioned in the space between the bearing and the guard, said guard being provided with means other than the gap for permitting the passage of air from the exterior of the guard to the interior of the casing through the bearing to thereby prevent the establishment of a pressure differential between the exterior and the interior of the guard which would cause air to be drawn through the gap.

3. In a device of the class described, the combination of a machine casing, a rotor shaft mounted in a bearing in a wall of said casing and projecting exteriorly beyond said casing, the interior of said casing being subject to a sub-atmospheric pressure which causes air to be drawn in through said bearing, and means for preventing liquid which may collect on the exterior of said shaft from being drawn into the casing with the air to the detriment of elements in the casing, said means comprising a liquid guard secured to the exterior of the casing and spaced from said bearing and surrounding said shaft and forming therewith a gap of a size to sustain a capillary column, said guard being provided with means other than the gap for permitting the passage of air from the exterior of the guard to the interior of the casing through the bearing to thereby prevent the establishment of a sufficient pressure differential between the exterior and the interior of the guard which would cause air to be drawn through the gap, said air passage means also permitting draining of liquid from the interior of the guard.

4. In a device of the class described, the combination of a machine casing, a rotor shaft mounted in a bearing in a wall of said casing and projecting exteriorly beyond said casing, the interior of said casing being subject to a sub-atmospheric pressure which causes air to be drawn through said bearing, means for preventing deteriorating liquid which may collect on the exterior portion of said shaft from being drawn into the casing with the air to the detriment of elements in the casing, said means comprising a liquid guard secured to the exterior of the casing and spaced from said bearing and surrounding said shaft and forming therewith a gap of a size to sustain a capillary column, and a radially projecting liquid discharge element on said shaft and rotating therewith and positioned in the space between the bearing and the guard, said guard being provided with an opening other than the gap for permitting the passage of sufficient air from the exterior of the guard to the interior of the casing through the bearing to thereby prevent the establishment of a pressure differential between the exterior and the interior of the guard which would cause air to be drawn through the gap, said air passage opening also permitting draining of liquid from the interior of the guard.

WALTER FREDERICK KELPE.